April 29, 1969      J. A. COVER      3,440,764

TAILGATE APPARATUS

Filed Jan. 2, 1968      Sheet _1_ of 4

INVENTOR.
JAMES A. COVER

BY
Schmieding & Fultz

ATTORNEYS

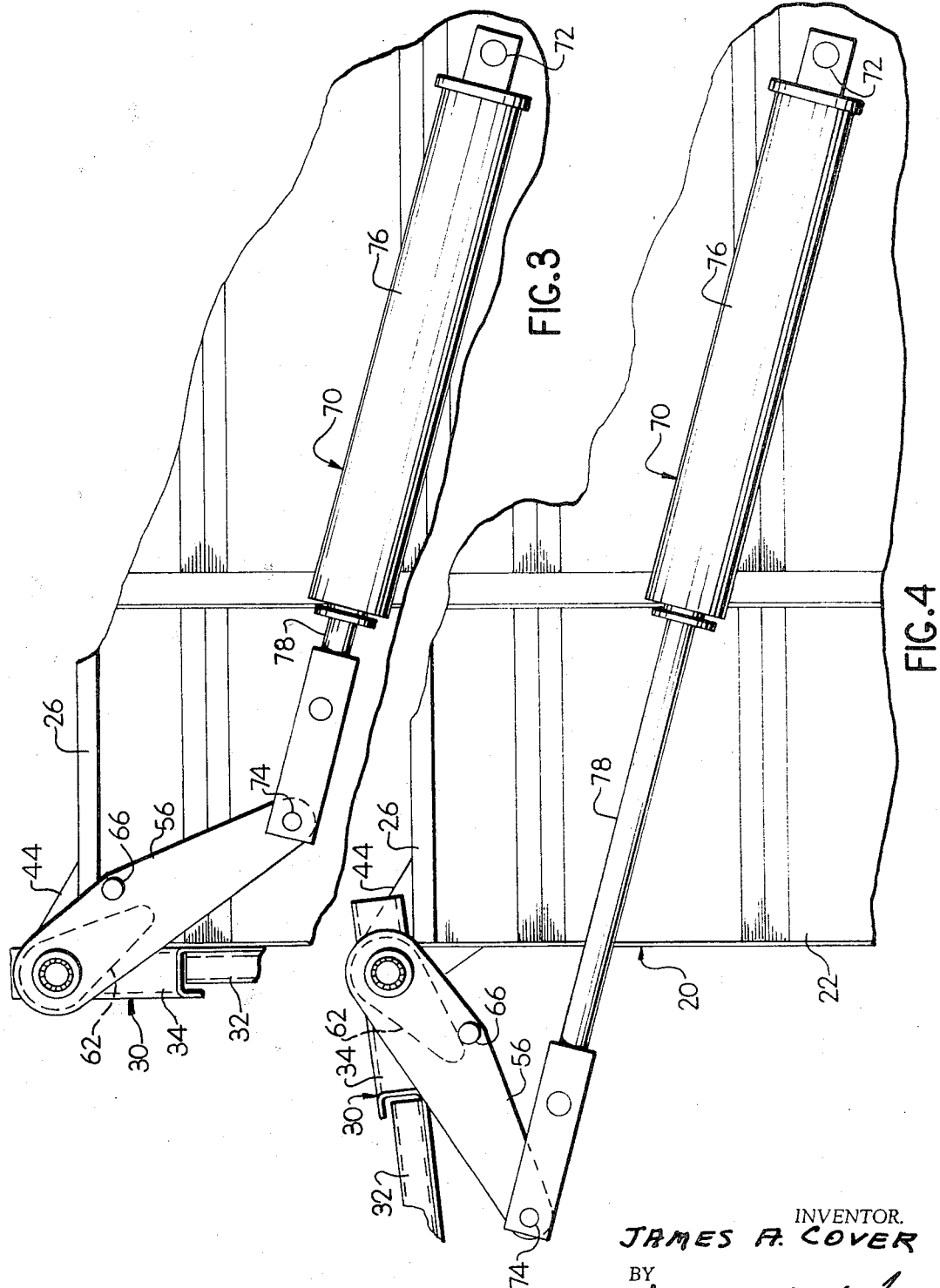

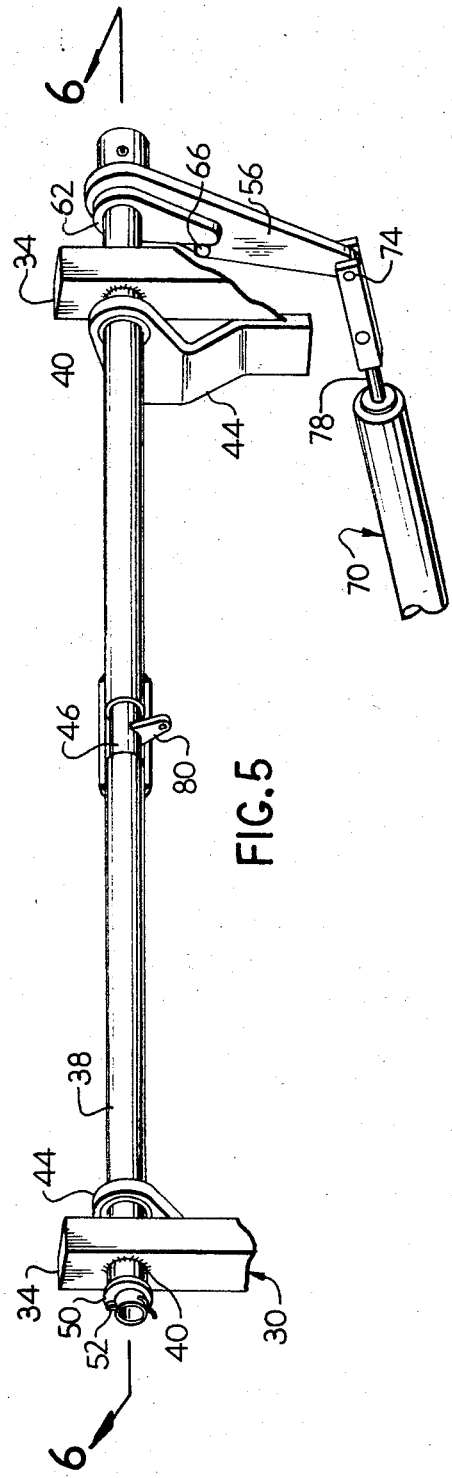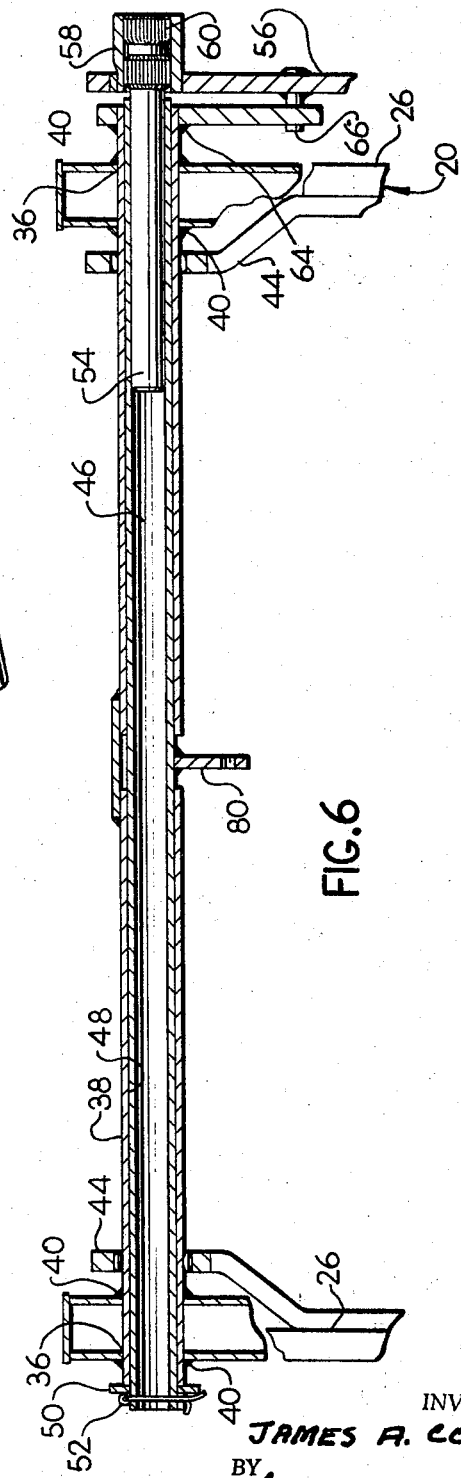

INVENTOR.
JAMES A. COVER
BY
Schmieding & Sultz
ATTORNEYS

United States Patent Office 3,440,764
Patented Apr. 29, 1969

3,440,764
TAILGATE APPARATUS
James A. Cover, Bucyrus, Ohio, assignor to Harsco Corporation, Harrisburg, Pa., a corporation of Delaware
Filed Jan. 2, 1968, Ser. No. 695,237
Int. Cl. E05f 15/00; B62d 25/00, 33/00
U.S. Cl. 49—280                                          7 Claims

ABSTRACT OF THE DISCLOSURE

A tailgate apparatus for vehicle bodies, such as farm wagon bodies, which apparatus includes power means for opening and closing the tailgate and associated latching means, for keeping the tailgate closed, that automatically unlatches prior to opening of the tailgate and automatically latches subsequent to closing of the tailgate means.

---

This application relates to tailgate apparatus for vehicle bodies and more particularly to a novel powered tailgate provided with automatic latching means.

In general, the tailgate apparatus of the present invention comprises a frame means that defines an access opening to the interior of the vehicle body and a gate means is provided for opening and closing said access opening. The gate means is mounted on a torque member that pivotally connects the gate means to the frame for opening and closing the gate means upon application of power to the torque member. Also, the gate means includes a latch mechanism operatively associated with the torque member for automatically unlatching and latching the gate means.

The apparatus further includes a power means adapted to sequentially actuate the latch mechanism and torque member for first unlatching and next opening the gate means. When the power means is reversed the gate means is closed and automatically latched.

It is therefore an object of the present invention to provide a novel tailgate apparatus which includes power means that actuates the tailgate and automatically operates a latch mechanism for the apparatus so as to latch and unlatch the tailgate when it is closed and opened.

It is another object of the present invention to provide a novel tailgate apparatus of the type described wherein a coaxially disposed torque tube and latch actuating shaft cooperate to serve the multiple functions of pivot means for mounting the tailgate to a vehicle body, gate actuating means for opening and closing the tailgate, and automatically actuated means for operating a latch mechanism.

It is still another object of the present invention to provide a novel tailgate apparatus that can be unlatched, opened, closed and latched from a remote location.

Other objects and advantages of the present invention will be apparent from the following description, reference being had to the accompanying drawings wherein a preferred form of embodiment of the invention is clearly shown.

Figure 1:
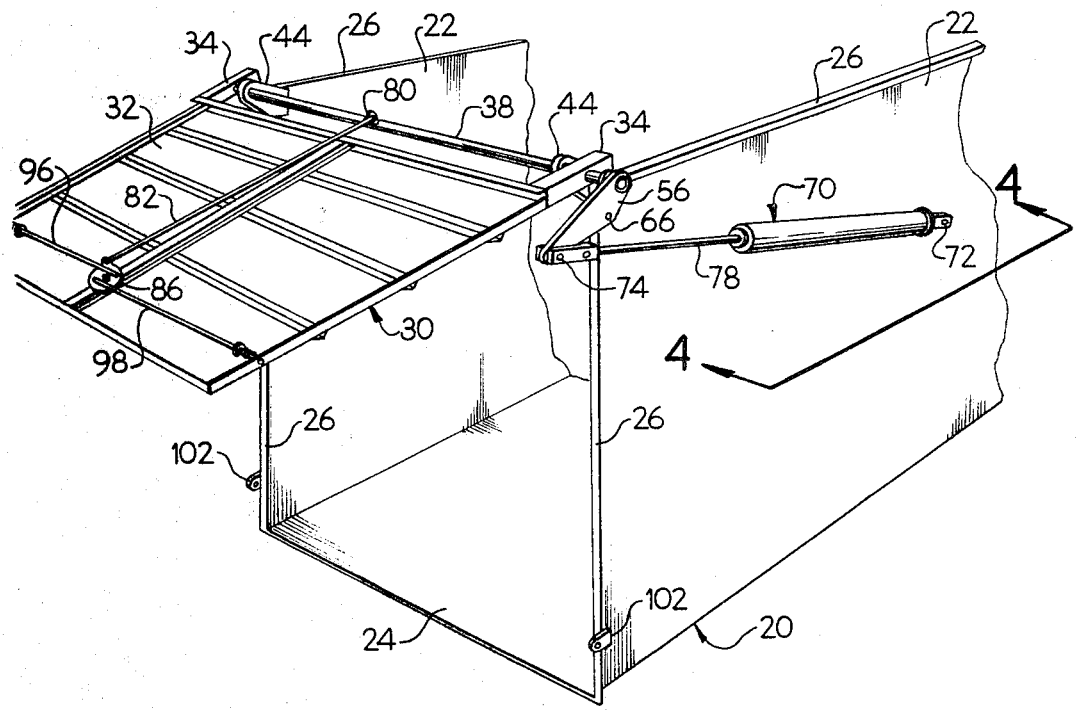
Figure 2:
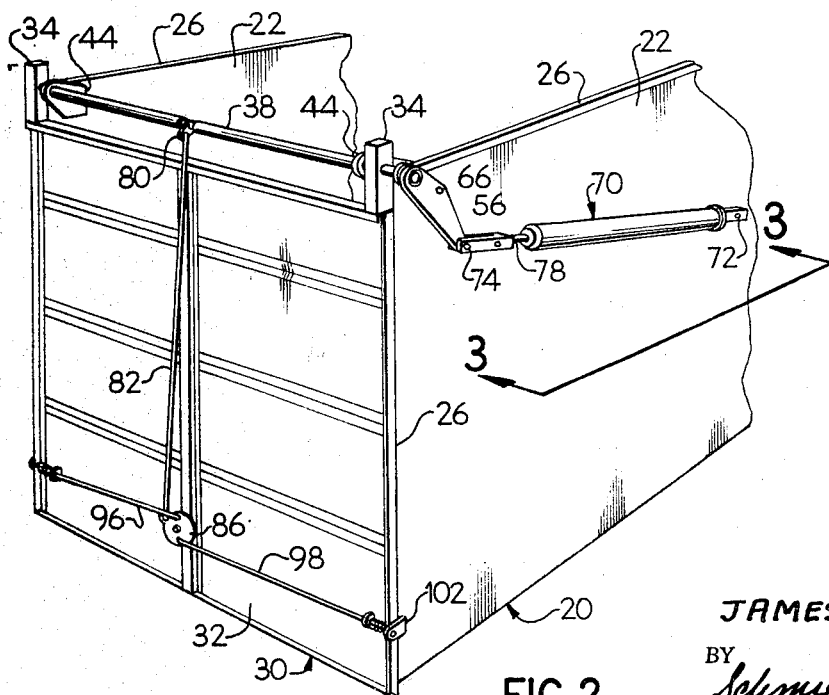
Figure 7:
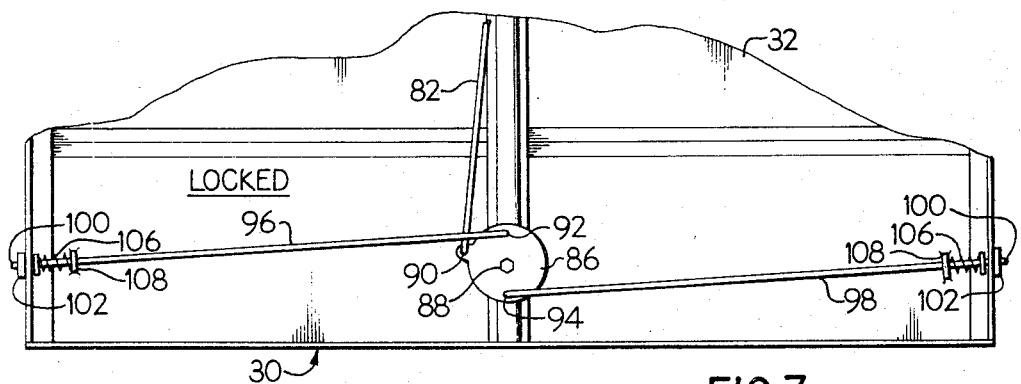
Figure 8:
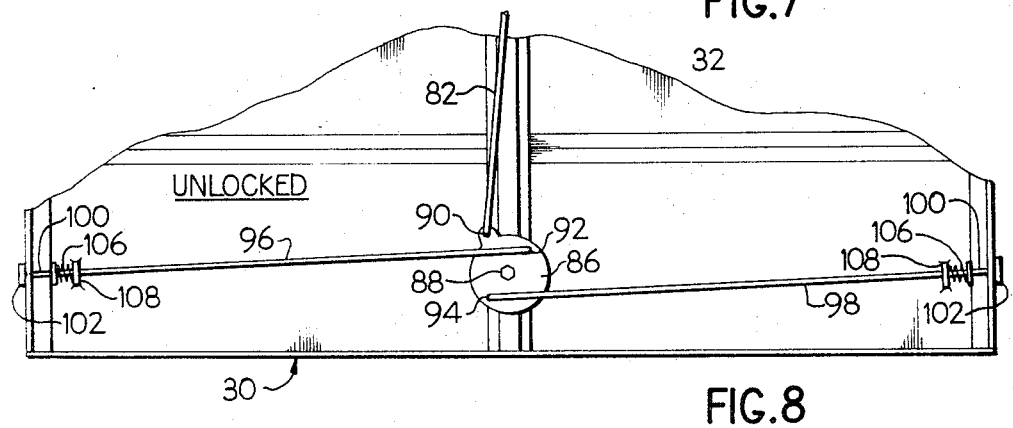
Figure 9:
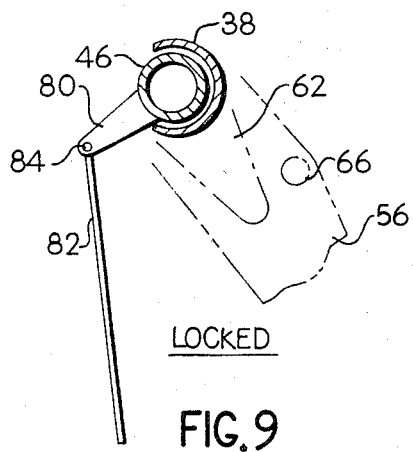
Figure 10:
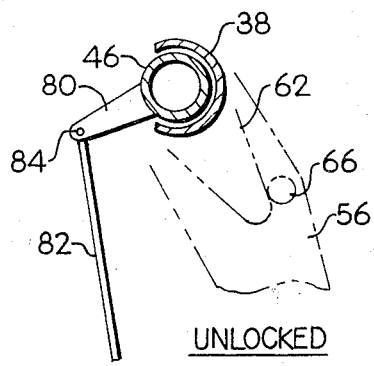

In the drawings:
FIG. 1 is a partial perspective view of a vehicle body having mounted thereon a tailgate apparatus constructed in accordance with the present invention;
FIG. 2 is a second perspective view of the tailgate apparatus of FIG. 1;
FIGS. 3 and 4 are partial side elevational views of the tailgate apparatus of the preceding figures;
FIG. 5 is a partial perspective view showing a torque tube and latch actuating shaft assembly comprising a portion of the apparatus of the preceding figures;
FIG. 6 is a rear sectional view of the torque tube and shaft assembly of FIG. 5;

FIGS. 7 and 8 are partial rear elevational views of a latch mechanism comprising a portion of the apparatus of the preceding figures; and
FIGS. 9 and 10 are side sectional views of the torque tube and latch actuating shaft assembly of the preceding figures, the section being taken along the line 9—9 of FIG. 6.

Referring in detail to the drawings, FIG. 1 illustrates a vehicle body indicated generally at 20 that includes side walls 22, a bottom wall 24 and frame members 26 that define the rear access opening for the vehicle body.

As is best seen in FIGS. 1–4 vehicle body 20 is provided with a tailgate apparatus indicated generally at 30 and includes a gate wall portion 32 and upright gate frame members 34.

Gate frame members 34 include lateral holes 36 in which are mounted a torque member or torque tube 38 as is best seen in FIG. 6.

With continued reference to FIG. 6, gate wall 32 is rigidly attached to torque tube 38 at the welds 40 whereby the gate wall pivots with the torque tube.

Referring again to FIGS. 1–4 torque tube 38 is journaled for rotation in bearing brackets 44 mounted on body frame members 26 which frame members, in combination with bearing brackets 44, serve as a frame means on which the apparatus is mounted.

Referring next to FIGS. 5 and 6 a latch actuating member, or rod, 46 is mounted for rotation in a bore 48 of torque tube 38, said rod being removably retained in bore 38 by washer 50 and cotter pin 52.

Referring again to FIG. 6, latch actuating rod 46 may be hollow and include a stub shaft 54 rigidly attached to the rod and a latch driving arm 56 is rigidly mounted on stub shaft 54 by a collar 58 which tightly grips the serrations 60 on the outer end of stub shaft 54.

As is best seen in FIGS. 3–6, a torque arm 62 which is rigidly attached to an end of torque tube 38 at welds 64 and said torque arm is disposed in the path of movement of a drive pin 66 carried by the previously mentioned latch driving arm 56.

With reference to FIGS. 3 and 4, a power means indicated generally at 70, which is illustrated in the form of a hydraulic cylinder connected between a first pivotal connection 72 with a vehicle body 20 and a second pivotal connection 74 with the previously mentioned latch driving arm 56.

Hydraulic cylinder 70 includes a cylinder portion 76 connected with a source of pressurized fluid and suitable control means, not illustrated, and a piston rod portion 78 which is extended and retracted responsive to admission and release of pressurized fluid to cylinder portion 76.

For purposes of describing the automatic latch mechanism of the present invention reference is next made to FIGS. 1, 2, and 7–10. Here it will be seen that a latch actuating shaft 46 includes a latch actuating arm 80 pivotally attached to a latch driving rod 82 at a pivot pin 84.

Latch driving rod 82 in turn has its lower end connected to a lever 86 pivotally mounted on tailgate wall 32 at a central pivot 88.

As is best seen in FIGS. 7 and 8, latch lever 86 includes a first pivotal connection 90 for the previously mentioned latch driving rod 82 and second and third pivotal connections 92 and 94 which are respectively connected to the inner ends of laterally extending rods 96 and 98. The outer ends of these rods include latch portions 100 and 103 positioned to be moved into latched engagement with holes that form female portions 102 carried by the frame means.

As seen in FIGS. 7 and 8, compression springs 106 on the outer ends of lateral rods 96 and 98 are retained in place by spring retainers 108.

In operation, when it is desired to open the tailgate apparatus 30, from the position of FIG. 2 to the position of FIG. 1, hydraulic cylinder 70 is pressurized by actuation of appropriate valve means, not illustrated, which may be located at a remote location. This extends piston rod 78 from the position of FIG. 3 to the position of FIG. 4.

At the outset of movement of piston rod 78, latch driving arm 56 is first moved alone until pin 66, which is normally spaced from torque arm 62, engages the side of torque arm 62. During such initial movement, latch driving shaft 46 is rotated in bore 48 of torque tube 38 with no torque being applied to said tube, and such rotation of shaft 46 raises latch actuating lever 80 from the position of FIG. 9 to the position of FIG. 10, which in turn rotates latch lever 86 from the locked positon of FIG. 7 to the unlocked position of FIG. 8. As the mechanism moves into the latter position, latch portion 100 on the ends of lateral rods 96 and 98 are moved inwardly and out of locked engagement with the holes in the female latch portions 102.

After latch portions 100 and 102 are disengaged, and referring to FIGS. 3 and 4, pin 66 engages the side of torque arm 62 which causes torque tube 38 and tailgate wall 32 mounted thereon, to pivot to the open position of FIGS. 2 and 4.

When the operator desires to close the tailgate apparatus, from the position of FIG. 1 to the position of FIG. 2, the previously mentioned controls are actuated to drain the cylinder portion 76 of power means 70 whereby the weight of the apparatus causes it to pivot to the closed position.

I claim:

1. A tailgate apparatus comprising, in combination frame means defining an opening; gate means for opening and closing said opening and including a torque member rotatably mounted on said frame means adjacent an edge of said opening; a latch actuating member; latch means mounted on one of said means and operatively connected to said latch actuating member, said latch means including a latch portion engagable with the other of said means; a torque arm mounted on said torque member; a latch driving arm mounted on said latch actuating member; and power means operatively connected to said torque and latch actuating members for sequentially actuating first said latch driving arm and next said torque arm, wherein said latch driving arm is connected to said power means and includes a first shoulder engagable with a second shoulder on said torque arm.

2. A tailgate apparatus comprising, in combination frame means defining an opening; gate means for opening and closing said opening and including a torgue member rotatably mounted on said frame means adjacent an edge of said opening; a latch actuating member; latch means mounted on one of said means and operatively connected to said latch actuating member, said latch means including a latch portion engagable with the other of said means; a torque arm mounted on said torque member; a latch driving arm mounted on said latch actuating member; and power means operatively connected to said torque and latch actuating members for sequentially actuating first said latch driving arm and next said torque arm, wherein said power means comprises a fluid actuated cylinder having one end connected to said frame means and the other end conected to said latch driving arm; and means for actuating said torque arm responsive to movement of said latch driving arm by said cylinder.

3. A tailgate apparatus comprising, in combination, frame means defining an opening; gate means for opening and closing said opening and including a torque tube rotatably mounted on said frame members; a latch actuating shaft rotatably mounted in said torque tube; latch means mounted on said gate means and operatively connected to said latch actuating shaft, said latch means including a latch portion engagable with said frame means; a torque arm mounted on said torque tube; a latch driving arm mounted on said latch actuating shaft; and power means operatively connected to said torque and latch actuating members for sequentially actuating first said shaft driving arm and then said torque arm, wherein said latch driving arm is connected to said power means and includes a first shoulder engagable with a second shoulder on said torque arm.

4. A tailgate apparatus comprising, in combination, frame means defining an opening; gate means for opening and closing said opening and including a torque tube rotatably mounted on said frame members; a latch actuating shaft rotatably mounted in said torque tube; latch means mounted on said gate means and operatively connected to said latch actuating shaft, said latch means including a latch portion engagable with said frame means; a torque arm mounted on said torque tube; a latch driving arm mounted on said latch actuating shaft; and power means operatively connected to said torque and latch actuating members for sequentially actuating first said shaft driving arm and then said torque arm, wherein said power means comprises a fluid actuated cylinder having one end connected to said frame means and the other end connected to said latch driving arm; and means for actuating said torque arm responsive to movement of said latch driving arm by said cylinder.

5. A tailgate apparatus comprising in combination, frame means defining an opening; gate means for opening and closing said opening and including a torque tube rotatably mounted on said frame members, said torque tube including a tube wall provided with a tube opening; a latch actuating shaft rotatably mounted in said torque tube; a latch actuating arm mounted on said shaft and extended through said tube opening in said tube wall; latch means mounted on said gate means and including a latch portion engageable with said frame means; a latch actuating rod connecting said latch means with said latch actuating arm; a torque arm mounted on said torque tube, a latch driving arm mounted on said latch actuating shaft; and power means operatively connected to said torque and latch actuating members for sequentially actuating first said latch driving arm and then said torque arm, wherein said latch driving arm is connected to said power means and includes a first shoulder engagable with a second shoulder on said torque arm.

6. A tailgate apparatus comprising in combination, frame means defining an opening; gate means for opening and closing said opening and including a torque tube rotatably mounted on said frame members, said torque tube including a tube wall provided with a tube opening; a latch actuating shaft rotatably mounted in said torque tube; a latch actuating arm mounted on said shaft and extended through said tube opening in said tube wall; latch means mounted on said gate means and including a latch portion engageable with said frame means; a latch actuating rod connecting said latch means with said latch actuating arm; a torque arm mounted on said torque tube, a latch driving arm mounted on said latch actuating shaft; and power means operatively connected to said torque and latch actuating members for sequentially actuating first said latch driving arm and then said torque arm, wherein said power means comprises a fluid actuated cylinder having one end connected to said frame means and the other end connected to said latch driving arm; and means for actuating said torque arm responsive to movement of said latch driving arm by said cylinder.

7. A tailgate apparatus comprising in combination, frame means defining an opening, gate means for opening and closing said opening and including a torque tube rotatably mounted on said frame members, said torque tube including a tube wall provided with a tube opening; a latch actuating shaft rotatably mounted in said torque tube; latch actuatig arm mounted on said shaft and extended through said tube opening in said tube wall; latch means mounted on said gate means and including a latch portion engagable with said frame means; a latch actuating rod connecting said latch means with said latch actuating arm; a latch driving arm mounted on said latch actuating shaft; power means for sequentially actuating first said latch driving arm and then said torque tube, said latch driving arm, being connected to said power means; and means for actuating said torque tube responsive to movement of said latch driving arm by said power means.

References Cited

UNITED STATES PATENTS

| 2,538,980 | 1/1951 | Payne | 49—280 |
| 2,999,683 | 9/1961 | Pickles | 49—280 X |
| 3,272,552 | 9/1966 | Park | 49—280 X |
| 3,305,263 | 2/1967 | Appleman | 296—56 |
| 3,306,655 | 2/1967 | Voehringer | 49—280 X |

DAVID J. WILLIAMOWSKY, *Primary Examiner.*

J. KARL BELL, *Assistant Examiner.*

U.S. Cl. X.R.

296—56